United States Patent
Anghel et al.

(10) Patent No.: US 10,754,773 B2
(45) Date of Patent: Aug. 25, 2020

(54) SELECTION OF VARIABLE MEMORY-ACCESS SIZE

(71) Applicant: International Business Machines Corporation, Armonk, NY (US)

(72) Inventors: Andreea Anghel, Adliswil (CH); Cedric Lichtenau, Stuttgart (DE); Gero Dittmann, Zürich (CH); Peter Altevogt, Ettlingen (DE); Thomas Pflueger, Leinfelden (DE)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/729,849

(22) Filed: Oct. 11, 2017

(65) Prior Publication Data
US 2019/0108123 A1    Apr. 11, 2019

(51) Int. Cl.
| | |
|---|---|
| *G06F 12/04* | (2006.01) |
| *G06F 9/30* | (2018.01) |
| *G06F 12/08* | (2016.01) |
| *G06F 12/06* | (2006.01) |
| *G06F 12/12* | (2016.01) |
| *G06F 12/0806* | (2016.01) |
| *G06F 12/0895* | (2016.01) |
| *G06F 12/128* | (2016.01) |

(52) U.S. Cl.
CPC .......... *G06F 12/04* (2013.01); *G06F 9/30043* (2013.01); *G06F 12/0646* (2013.01); *G06F 12/0806* (2013.01); *G06F 12/0895* (2013.01); *G06F 12/128* (2013.01); *G06F 9/30181* (2013.01); *G06F 2212/27* (2013.01)

(58) Field of Classification Search
CPC .. G06F 12/04; G06F 9/30043; G06F 12/0646; G06F 12/0806; G06F 2212/27; G06F 12/0895; G06F 12/128; G06F 9/30181
See application file for complete search history.

(56) References Cited

U.S. PATENT DOCUMENTS

| | | | |
|---|---|---|---|
| 5,956,745 A * | 9/1999 | Bradford | G06F 3/0605 711/137 |
| 8,185,693 B2 | 5/2012 | Toub et al. | |
| 8,341,380 B2 | 12/2012 | Deming et al. | |
| 8,402,198 B1 | 3/2013 | de la Iglesia et al. | |
| 8,943,272 B2 | 1/2015 | Bell, Jr. et al. | |
| 9,069,676 B2 | 6/2015 | Iglesia et al. | |
| 2002/0042861 A1* | 4/2002 | Kavipurapu | G06F 12/08 |

(Continued)

OTHER PUBLICATIONS

Cao et al., "Adaptive Line Size Cache for Irregular References on Cell Multicore Processor," Network and Parallel Computing, 6289, Springer, pp. 314-328, 2010, Lecture Notes in Computer Science, 978-3-642-15671-7.

(Continued)

*Primary Examiner* — Masud K Khan
(74) *Attorney, Agent, or Firm* — Jay Wahlquist

(57) ABSTRACT

A method for dynamically selecting a size of a memory access may be provided. The method comprises accessing blocks having a variable number of consecutive cache lines, maintaining a vector with entries of past utilizations for each block size, and adapting said block size before a next access to the blocks.

20 Claims, 6 Drawing Sheets

(56) References Cited

U.S. PATENT DOCUMENTS

| | | | | |
|---|---|---|---|---|
| 2012/0303927 A1* | 11/2012 | Goldberg | ............... | G06F 12/02 |
| | | | | 711/171 |
| 2016/0092359 A1 | 3/2016 | Busaba et al. | | |
| 2017/0083339 A1* | 3/2017 | Burger et al. | ............. | G06F 9/38 |

OTHER PUBLICATIONS

Chen et al., "History-Assisted Adaptive-Granularity Caches (HAAG$) for High Performance 3D DRAM Architectures," ICS '15 Proceedings of the 29th ACM on International Conference on Supercomputing, pp. 251-261, Newport Beach, California, Jun. 8-11, 2015, abstract only.

Kumar et al., "Amoeba-Cache: Adaptive Blocks for Eliminating Waste in the Memory Hierarchy," MICRO-45 Proceedings of the 2012 45th Annual IEEE/ACM International Symposium on Microarchitecture, pp. 376-388, Dec. 1-5, 2012, abstract only.

Nicolaescu et al., "Compiler Directed Cache Line Size Adaptivity," In Proceedings IMS '00, Springer Verlag London, UK, 2001, 5 pgs.

Oxtexts, "5.2 Some useful predictors," https://www.otexts.org/fpp/5/2, printed Oct. 3, 2017, 6 pgs.

Rohbani et al.,"Bias Temperature Instability Mitigation via Adaptive Cache Size Management," IEEE Transactions on Very Large Scale Integration (VLSI) Systems, 1063-8210 © 2016 IEEE, 11 pgs.

Sundararajan et al., "Smart Cache: A Self Adaptive Cache Architecture for Energy Efficiency," In Proc. of the Int. Conference on Embedded Comp. Systems: Architectures, Modeling and Simulation, pp. 41-50 (Jul. 2011).

Tang et al., "Cache With Adaptive Fetch Size," Technical Report ICS-00-16, Apr. 22, 2000, 25 pgs.

Tang et al., "Dynamically Adaptive Fetch Size Prediction for Data Caches," Innovative Architecture for Future Generation High-Performance Processors and Systems, 2003, 5 pgs.

Van Fleet et al., "Pursuing the Performance Potential of Dynamic Cache Line Sizes," Proceedings of 1999 International Conference on Computer Design, Nov. 1999, pp. 528-537.

Veidenbaum et al., "Adapting Cache Line Size to Application Behavior," In Proceedings ICS'99, Jun. 1999, 10 pgs.

* cited by examiner 100 method

102 accessing blocks having a number of consecutive cache lines

104 maintaining a vector with entries of past utilizations for each block size

106 adapting the block size before a next access to the blocks

SELECTION OF VARIABLE MEMORY-ACCESS SIZE

BACKGROUND

Cache architectures have a long history in the design of computer systems. In many cases, they help to increase an access speed—or in other words, to decrease the access time—between a CPU (central processing unit) and a main memory. This helps to reduce the so-called Von-Neumann bottleneck and may increase the speed of processing dramatically.

Different cache architectures have been introduced over time, including L1, L2 and L3 caches, e.g., as inclusive or exclusive caches. Today, load and store instructions to and from the main memory are performed with a fixed amount of payload, e.g., 64 bytes or 128 bytes. This may be sub-optimal during various phases of workload execution. E.g., during workload phases with a lot of scattered data with sizes of only a few bites to be loaded or stored, a large payload size (large cache line size) may result in loading a lot of data that are not used by the workload, or storing data that have not been updated. This results in a waste of precious memory bandwidth and potentially increased latencies and may furthermore result in conflicts for unused data.

On the other side, during workload phases with accesses to a large amount of continuous data (e.g., simple one-dimensional arrays) to be loaded or stored, a small payload size may result in many concurrent load or store instructions in flight or even in serialization of request execution. Both of these scenarios will result in a decrease of throughput and add to an unnecessary consumption of computing resources, like number of gates and required power.

SUMMARY

Aspects of the disclosure may include a computer implemented method, computer program product, computing device and system for dynamically selecting a size of a memory access is provided. An example method comprises blocks having a variable number of consecutive cache lines, maintaining a vector with entries of past utilizations for each block size, and adapting the block size before a next access to the blocks. It may be noted that the blocks may refer to blocks of accessed data.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
FIG. 1 shows a block diagram of one embodiment of an example method for dynamically selecting a size of a memory access.
Figure 1:
Figure 1:

In the context of this description, the following conventions, terms and/or expressions may be used:

The term 'dynamically selecting', in particular dynamically selecting the 'size of a memory access' denotes that the amount of data accessed—either for a movement from main memory to the CPU cache or the other way around—is selected during an execution of programs. The data mentioned may be a mixture of instructions and data. This may be performed by dynamically exchanging load and/or store instructions that reflect individually the amount of transferred data, i.e., the block size.

The term 'runtime' denotes a time during an execution of a program, e.g., a system program or a user program.

The term 'block' denotes a group of data—i.e., real data and/or instructions—comprising a consecutive number of cache lines.

The term 'cache line' denotes a certain number of words to be transferred from the main memory to the CPU cache. Typically, the cache line has a fixed size and may represent the smallest amount of data being transferred between the CPU cache and the main memory, or vice versa.

The term 'vector with entries of past utilizations' denotes—mathematically spoken—a group of elements, wherein each element may represent a utilization of historic block sizes during data transfers between the CPU cache and a main memory or vice versa. Again, the blocks may comprise one or more cache lines.

The term 'cache' denotes a hardware or software component that may store data, so that future requests for that data can be served faster; the data stored in a cache might be the result of an earlier computation, or the duplicate of data stored elsewhere. A cache hit occurs when the requested data can be found in a cache, while a cache miss occurs when it cannot be found in a cache. Cache hits are served by reading data from the cache, which is faster than re-computing a result or reading from a slower data store; thus, the more requests can be served from the cache, the faster the system performs. In the context of the here proposed concept, the cache may be a CPU cache allowing faster access to data on the main memory.

The proposed method for dynamically selecting a size of a memory access may offer multiple advantages and technical effects. For example, the increased flexibility in the cache management may help to increase processing speed of the CPU/cache/main memory combination without having to decrease the cycle time, i.e., increase the operating frequency, with the known negative effects (e.g., higher currents, more heat dissipation requirements and so on). Depending on recent accesses to the memory and depending on a vector with information about the recent accesses, a variable block size may be applied in order to vary the number of consecutive cache lines to be transferred from the main memory to the CPU cache, or vice versa.

It may be pointed out that it is not required to change the size of the individual cache line or the size of the cache itself. Such an alternative approach may require a lot of complex design changes as well as a large number address recalculations during operation. The proposed solution does not have these negative effects. Using different load and store instructions, the number of consecutive cache lines accessed (i.e., moved from main memory to the CPU cache, or vice versa) may be varied. Consequently, also the size defined by the number of bytes required for accessing one or more cache lines at the same time may not change. Consequently, the instructions for accessing a different number of consecutive cache lines may be exchanged dynamically "on the fly" during execution of a workload.

This may help to adapt the cooperation between the CPU, the cache memory and the main memory depending on the type of workload. If only individual words are accessed during execution, the number of consecutive cache lines may be reduced to e.g., one; if on the other side, a larger number of consecutive addresses spanning a plurality of the cache line size may be accessed, the number of consecutive cache lines loaded or stored may be increased by simply changing the load/store instruction dynamically.

This may be completely transparent to a user program and to a large degree also transparent to the existing cache management of operating systems. The dynamical adaption of the variable number of consecutive cache lines may be completely implemented in hardware modules or as microcode. Its functionality may also be completely independent from software dependencies, e.g., single-user environment, multi-user environment, hypervisor-based execution, operating systems, and so on.

According to one embodiment of the method, the adapting the block size may be performed by the following: upon the utilization of a past block size being below a low threshold value, decreasing the block size to an adapted block size or, upon the utilization of a past block size being greater than a high threshold value, increasing the block size to the adapted block size. As default value, the block size may remain unchanged. Hence, depending on the size of recent accesses (i.e., to the cache or to the main memory), the size for the next access may be changed dynamically, i.e., during runtime of any program. This method alternative focusses on the past utilization and compares the threshold values.

According to one alternative embodiment of the method, the adapting the block size may be performed by applying an algorithm—in particular a cognitive algorithm, e.g., a neural network, or in form of a time series algorithm or in form of a linear regression algorithm—to the vectors of past utilizations for predicting the utilization of the block size. Hence, using this alternatively preferred embodiment, the dynamic adaption of the block size may not be performed simply based on historic values—e.g., by building an average number—but by an active prediction of an expected suitable block size in the future.

Thus, the proposed method and system may change its behavior between the option "past" and "future".

According to another embodiment of the method, the adapting the block size may be performed after an actual memory access by one of the load or store instructions. Thus, the adapted block size may be applied to future accesses, i.e., future data transfers from the main memory to the CPU cache or vice versa. The method and the system may allow the switch between the alternatives "after" and "during".

According to another embodiment of the method, the adapting the block size may be performed during an actual memory access by one of the load or a store instruction and may thus be applied to the current memory access. Hence, the instruction relating to a larger number of consecutive cache lines may be selected or exchanged during the instruction fetch operation.

According to another embodiment of the method, the method may also comprise using different load instructions for different block sizes. If the load instruction is coupled to the block size, different block sizes may be accessed by using different load instructions. The total length of the load and store instructions, measured in number of bits required, do not vary.

In this sense and according to another embodiment of the method, the different load instructions may differ in the size of the loaded or accessed block sizes by predefined factors. The factor may be any integer number (e.g. 2 or 3 or 4, etc.). Practical boundary conditions may limit the factor to a single digit integer value. Hence, the instruction set design is flexible. The additional instruction(s) may be implemented in micro-code or may be implemented in hardware; also, a mixture of both implementation alternatives may be possible.

The same thought may be applicable for storage instructions. Hence, according to another embodiment, the method may comprise using different store instructions for different block sizes. Consequently, and according to a further preferred embodiment of the method, the different store instructions differ in the size of the stored block sizes by predefined factors compared to a basic store instruction. Regarding the factors, the same thought as for the load instruction may apply also here.

According to one optional embodiment, the method may comprise determining the most recent past utilization value of the entries of a past utilization. This way the related vector may have a limited size and may thus only require limited storage space.

According to another optional embodiment, the method may also comprise determining an average of past utilization values of the entries of past utilizations in constant time intervals. That may be, e.g., the last 10 utilizations (alternatively, 2, 4, 8, 16 or any other integer number). This way, more storage capacity may be required for the vector of past utilizations of a block size if compared to a usage of the most recent past utilization. As an example: for e.g. for n=10 utilizations a vector may look like this: [0.3, 0.5, 0.2, 0.6, 0.8, 0.7, 0.9, 0.8, 0.7, 0.9].

According to another embodiment of the method, the applying the algorithm to the vectors of past utilizations may be at least based on one selected out of the group comprising time-series-based forecasting, a linear regression and a suitable neural network algorithm. This may be instrumental to an implementation of a machine learning and self-adapting function regarding the selected block size.

In the following, a detailed description of the figures will be given. All instructions in the figures are schematic. Firstly, a block diagram of an embodiment of one example method for dynamically selecting a size of a memory access is given. Afterwards, further embodiments, as well as embodiments of the method for dynamically selecting a size of a memory access, will be described.

FIG. 1 shows a block diagram of an embodiment of the proposed method 100 for dynamically selecting a size of a memory access—in particular, measured in number of consecutive cache lines—at runtime, i.e., during an execution time of software programs. The method 100 comprises accessing, 102, blocks—in particular by loading and/or storing instructions and data—having a variable number of consecutive cache lines; maintaining, 104, a vector with entries of past utilizations for each block size (again defined by number of cache lines per block); and adapting, 106, the block size before a next access to the block. It may be mentioned that the number of consecutive cache lines may start at 1.

Figure 2:
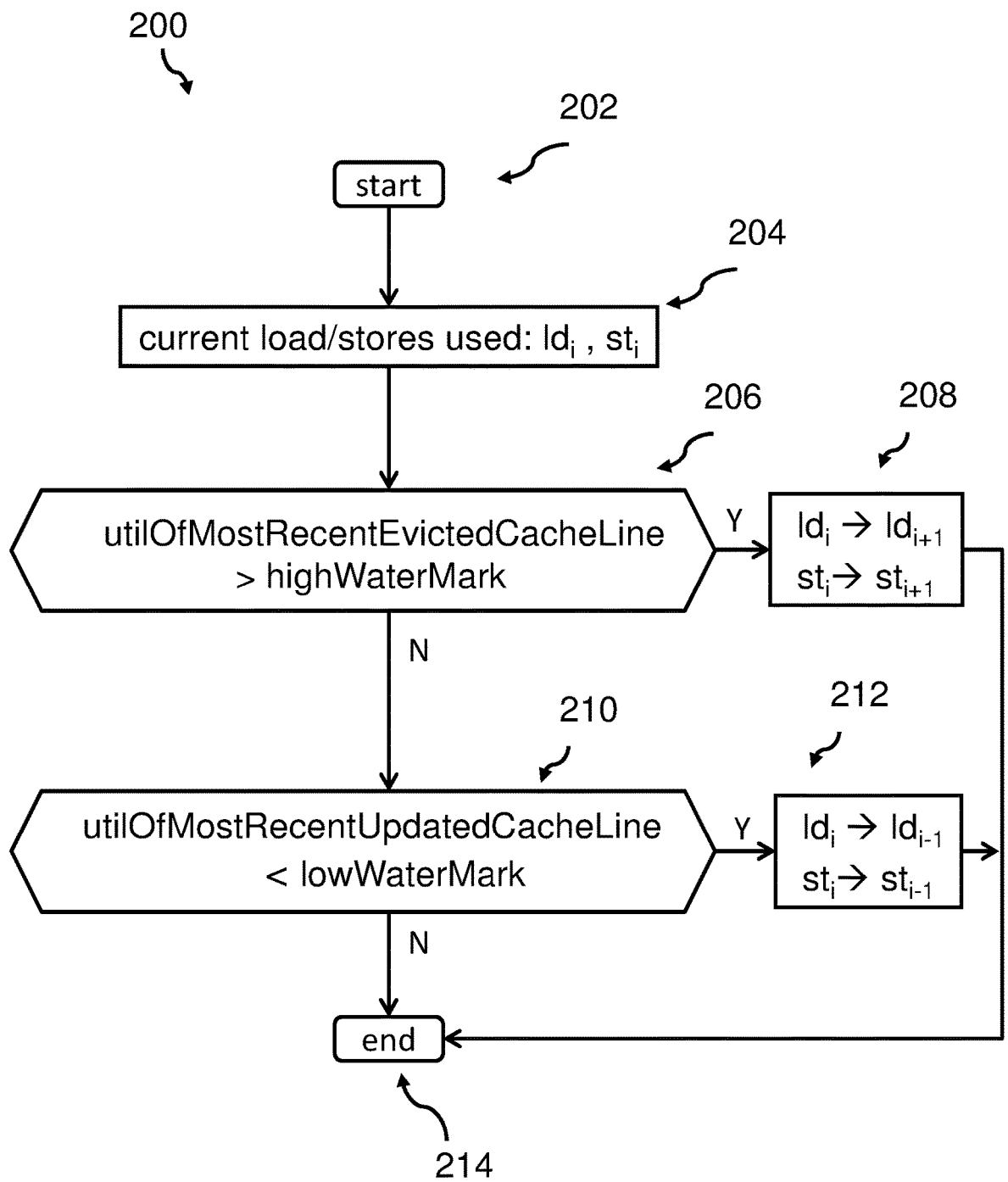
FIG. 2 shows a block diagram of an example flowchart for adapting dynamically the number of cache lines transferred between the CPU cache and a main memory.

FIG. 2 shows a block diagram of a flowchart 200 for adapting dynamically the number of cache lines transferred between the CPU cache and a main memory. The instruction "$ld_i$" stands for "load i cache lines" from main memory to the CPU cache, whereas "$st_i$" stands for "store i cache lines from the CPU cache to the main memory", wherein i=1, 2, 3, . . . . The process of the adaption of the load and store instructions may start at 202. At a current point in time, the load and store instructions $ld_i$, $st_i$ are used, block 204.

During the determination 206, it may be determined if the utilization of the most recent evicted block is larger than a high water mark, i.e., a high threshold, an adaption of the used load and/or store instruction may be performed dynamically. It may be noted that a block is called "evicted" if one cache line of the block is evicted. In case of yes ("Y") either the load $ld_i$ and/or the store $st_i$ instruction may be changed—block 208—to a load and/or store instruction with an increased number of consecutive cache lines to be loaded or stored, i.e., $ld_{i+1}$ and/or $st_{i+1}$. Consequently, the next access to the cache—either load or store—may use the dynamically exchanged load and/or store operation.

If on the other side—case "N" of determination 206—during the determination 210 the utilization of the most recent evicted block is smaller than a low-water mark, i.e., a low threshold, and a different adaption to the used load and/or store instruction may be performed dynamically. In case of no ("N") of the determination 210, either the load $ld_i$ and/or the store $st_i$ instruction may be changed—block 212—to a load/and/or store instruction with a decreased number of consecutive cache lines to be loaded or stored, i.e., $ld_{o-1}$ and/or $st^{ü1}$. Consequently, the next access to the cache—either load or store—may use the dynamically changed—here with a decreased number of cache lines—load and/or store operation. The adaption process may end at 214.

As discussed above, the adaption process may be performed after an actual memory access or alternatively during an actual memory access.

Figure 3:
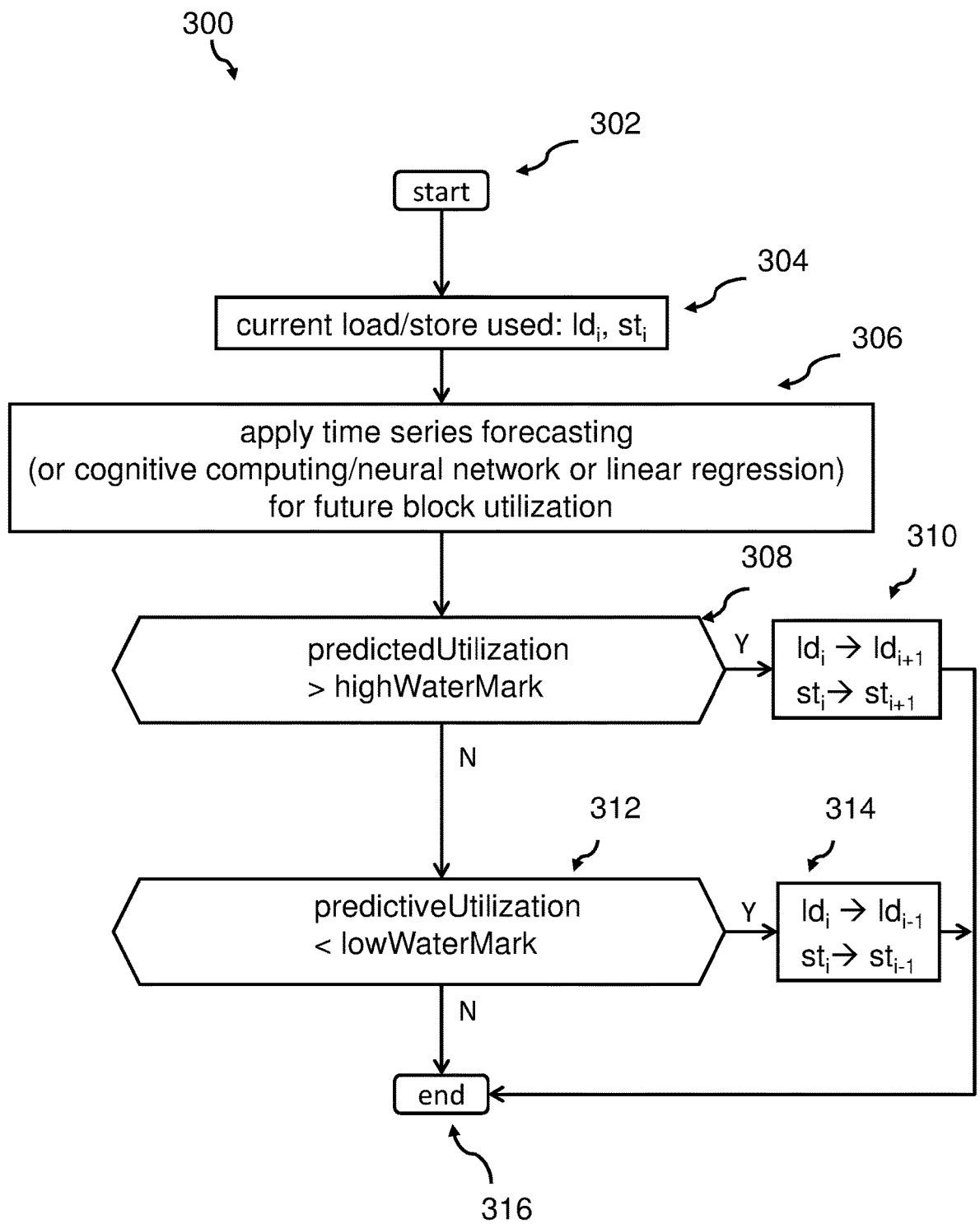
FIG. 3 shows a block diagram of an alternative example flowchart for adapting dynamically the number of cache lines transferred between the CPU cache and a main memory.

FIG. 3 shows a block diagram of an alternative flowchart 300 for adapting dynamically the number of cache lines transferred between the CPU cache and a main memory. Again, the instruction "$ld_i$" stands for "load i cache lines" from main memory to the CPU cache, whereas "$st_i$" stands for "store i cache lines from the CPU cache to main memory". The process of the adaption of the load and store instructions may start at 302. At a current point in time, the load and store instructions $ld_i$, $st_i$ are used, block 304.

Next, a forecasting or prediction for a future cache line utilization may be calculated, block 306. As an example, a time series algorithm may be applied, however, also alternative algorithms including linear regression or other machine learning algorithms, like any type of cognitive computing algorithm for predicting a future block size/cache line utilization, may be implemented.

Next, during the determination 308 it may be determined if the predicted utilization "predictedUtilization" is larger than a high water mark, i.e., a high threshold, an adaption of the used load and/or store instruction may be performed dynamically. In case of yes ("Y") either the load $ld_i$ and/or the store $st_i$ instruction may be changed—block 310—to a load and/or store instruction with an increased number of consecutive cache lines to be loaded or stored, i.e., $ld_{i+1}$ and/or $st_{i-1}$. Consequently, the next access to the cache—either load or store—may use the dynamically exchanged load and/or store operation.

If on the other side—case "N" of determination 308—during the determination 312 the predicted utilization of bocks is smaller than a low-water mark, i.e., a low threshold, and a different adaption to the used load and/or store instruction may be performed dynamically. In case of yes ("Y") of the determination 312, either the load $ld_i$ and/or the store $st_i$ instruction may be changed—block 314—to a load/and/or store instruction with a decreased number of consecutive cache lines to be loaded or stored, i.e., $ld_{i-1}$ and/or $st_{i-1}$. Consequently, the next access to the cache—either load or store—may use the dynamically exchanged—here with a decreased number of cache lines—load and/or store operation. The adaption process may end at 316.

Also, as in the case above, the adaption process may be performed after an actual memory access, or alternatively, during or just before an actual memory access.

Figure 4:
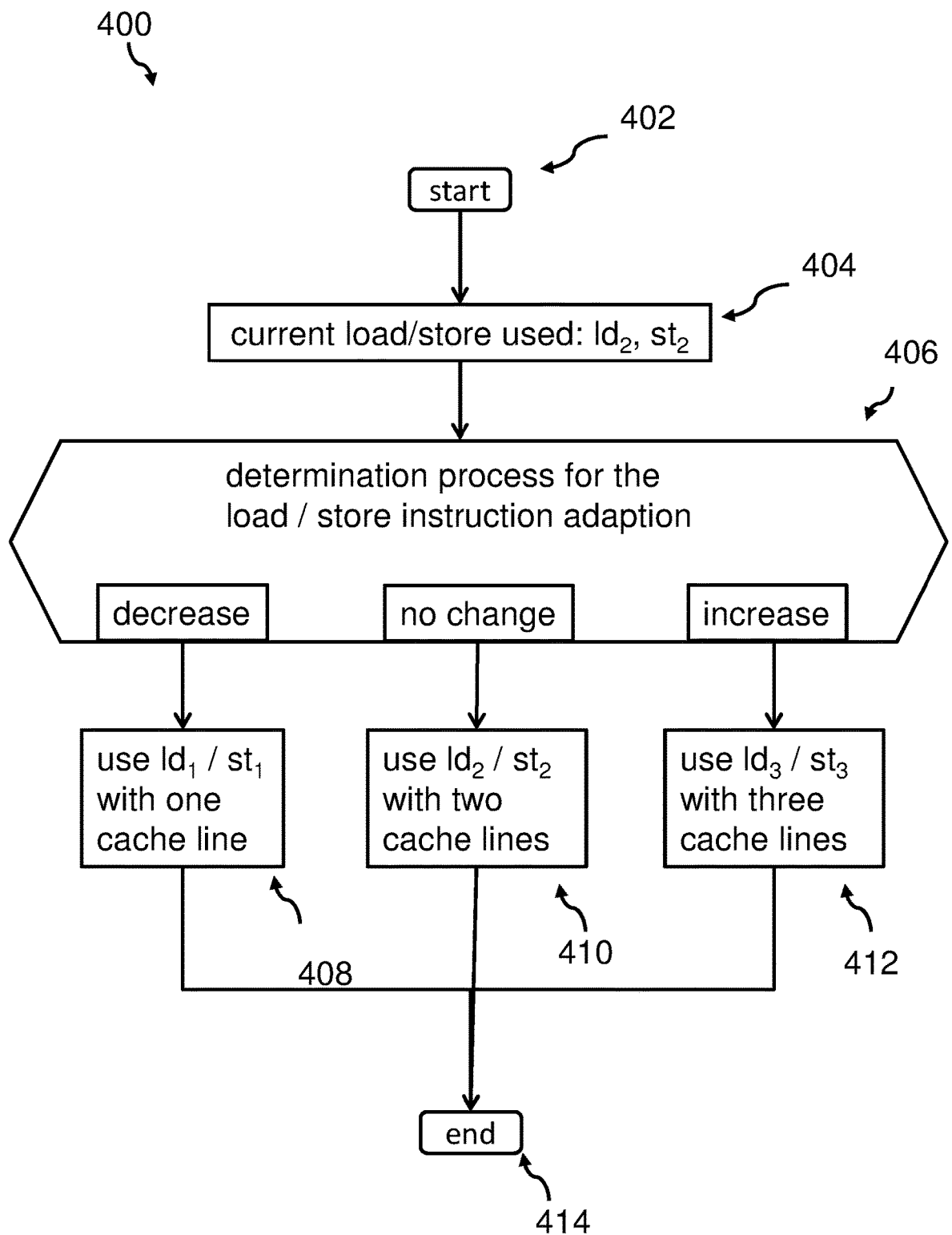
FIG. 4 shows an embodiment of different alternatives of the proposed method summarized in one figure.

FIG. 4 shows possible scenarios in a more concrete form. This process 400 may start at 402. The currently used load/store instruction may be either an $ld_2$ or an $st_2$ instruction, block 404. During the determination process for the load/store instruction adaption, three different alternatives may become part of the process. In one case the number of consecutive cache lines to be loaded or stored is unchanged, block 410. If it may be determined that the number of consecutive cache lines has to be decreased for a load/store access, the left alternative, block 408 is used, resulting in using an $ld_1$ and/or $st_1$ instruction loading and/or storing just one cache line. If the $ld_1/st_1$ instruction has been the current access instruction, it is not reduced further; it simply stays as $ld_1/st_1$ in case of a decrease.

If, on the other hand, it may be determined that the number of consecutive cache lines has to be increased for a load/store access, the right alternative, block 412 is used, resulting in using an $ld_3$ and/or $st_3$ instruction loading and/or storing three consecutive cache lines. A skilled person will know how other examples with more than three cache lines can easily be imagined and implemented. The determination process 406 may be one of the alternatives discussed in the context of FIG. 2 or FIG. 3. This process flow ends at block 414.

In one embodiment using the predictive model (compare FIG. 3), the following sequence of steps may be implemented: (i) For each eviction event, the average utilization of the blocks per block size is measured and appended to the vector of utilizations corresponding to the related block size. (ii) For each load/store event, the predicted utilization of the current block size is fetched and used in combination with the high and low thresholds to decide about the decrease or the increase of the block size of the next access. (iii) The predicted utilization would be given by a cognitive model corresponding to the current block size. (iv) The cognitive model would be built with utilization data specific to the block size.

This may assume the existence of a bookkeeping mechanism like: (1) whether the cache line has been used or not (a ⅛ bit per cache line); and (2) a utilization vector (of limited sizes to avoid infinite growth) per block size. When a maximum size is reached, the least recent calculated utilization will take the place of the oldest utilization data. Hence, under the condition of (1), the utilization of a block is basically the number of "1s" divided by the cache lines in the block.

The task of the cognitive model would be to predict the next "b" (typically b=1) utilizations given the most recent "a" utilizations. One model per block size may be possible.

The cognitive model can be trained with N sequences of (a+b) successive utilizations. The training data will be a set of N tuples ("a" utilizations, "b" utilizations). At inference time, the model of the current block size will be used to predict the next utilization, given the most recent calculated "a" utilization data. Optionally, the cognitive model can be trained periodically. After a re-training, the old model can be swapped with the new model.

Figure 5:
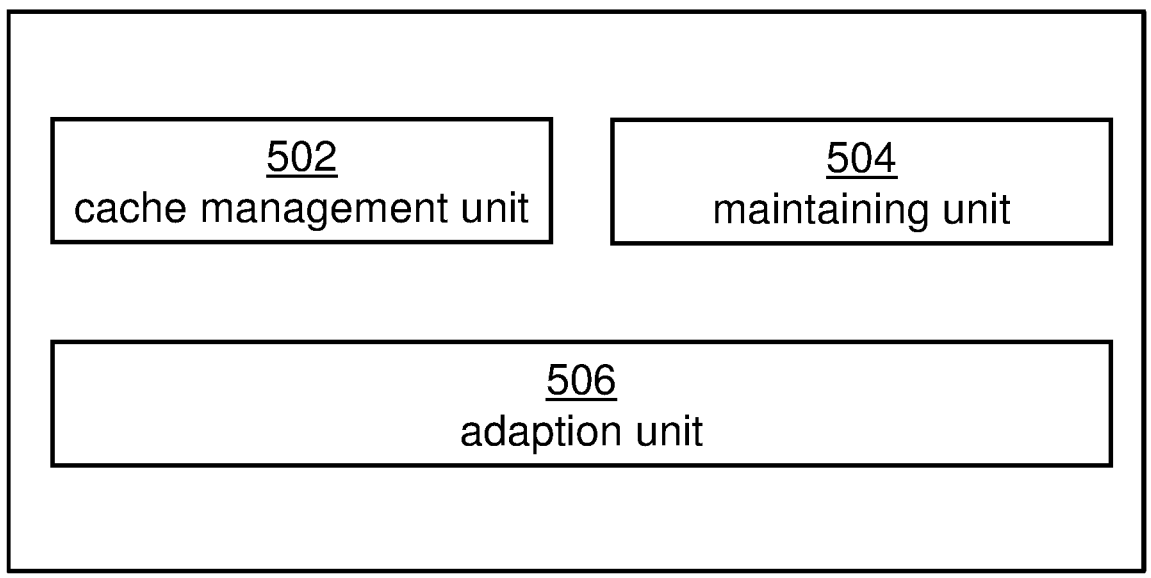
FIG. 5 shows a block diagram of one embodiment of an example system for dynamically selecting a size of a memory access.

FIG. 5 shows an embodiment of the system 500 for dynamically selecting a size of a memory access at runtime. The system comprises a cache management unit 502 adapted for accessing blocks having a variable number of consecutive cache lines, a maintaining unit 504 adapted for maintaining a vector with entries of past utilizations for each block size, and an adaption unit 506 adapting the block size before a next access to the blocks. It may be noted that the adaption unit may, e.g., be a component of a cache control/management logic, or alternatively, the memory management unit of a computer or a part of the fetch unit of the processor.

Embodiments of the invention may be implemented together with any type of computer, regardless of the platform being suitable for storing and/or executing program code.

Figure 6:
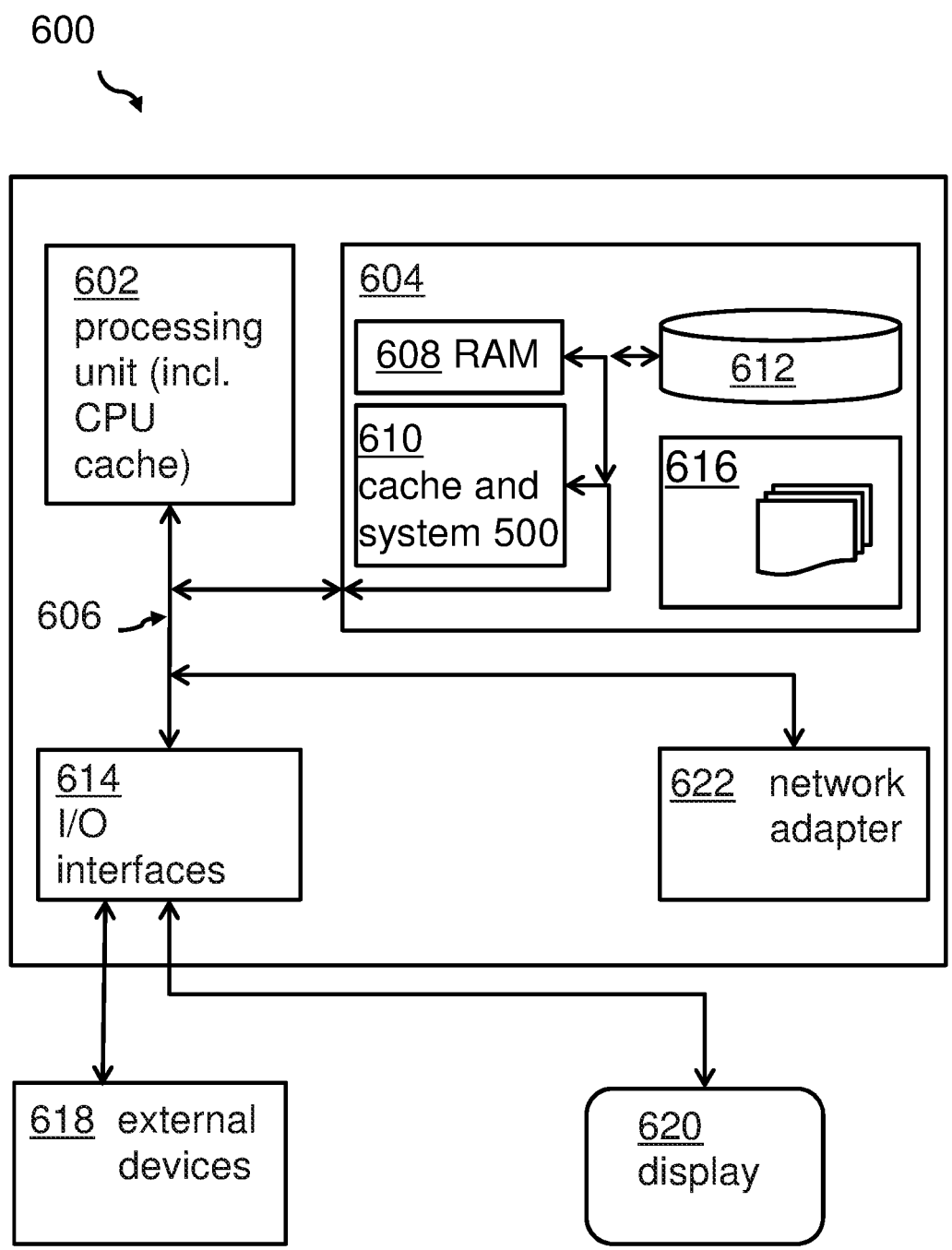
FIG. 6 shows a block diagram of one embodiment of an example computing system comprising the system according to FIG. 5.

FIG. 6 shows, as an example, a computing system 600 suitable for executing program code to implement the methods described above with respect to FIGS. 1-4. Additionally, computing system 600 can be configured to execute program code to implement one or all of the functions of cache management unit 502, maintaining unit 504, and adaption unit 506 discussed above with respect to FIG. 5.

The computing system 600 is only one example of a suitable computer system and is not intended to suggest any limitation as to the scope of use or functionality of embodiments described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments described herein.

The program/utility, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the system 500 for dynamically selecting a size of a memory access is integrated into the block 610 of the cache memory to symbolize that its function is closely related to the data transfer between the CPU and the main memory/RAM 608.

The descriptions of the various embodiments have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for dynamically selecting a size of a memory access at runtime, said method comprising:
   accessing a plurality of blocks, each block having a variable block size defined by a number of consecutive cache lines in each block;
   maintaining a vector with entries indicating a number of past block size utilizations for each block size; and
   adapting a next block size of a next block before a next access to said next block based on the number of past block size utilizations for each block size.

2. The method according to claim 1, wherein said adapting said next block size is performed by:
   in response to determining, based on the vector, that a past block size being below a low threshold value has been utilized in a most recent access, decreasing said next block size to a first adapted block size, and
   in response to determining, based on the vector, that a past block size being greater than a high threshold value has been utilized in the most recent access, increasing said next block size to a second adapted block size.

3. The method according to claim 1, wherein said adapting said next block size is performed by applying an algorithm to said vector of past block size utilizations for predicting an adapted block size.

4. The method according to claim 1, wherein said adapting said next block size is performed after an actual memory access by one of a load instruction or a store instruction.

5. The method according to claim 1, wherein said adapting said next block size is performed during an actual memory access by one of a load instruction or a store instruction.

6. The method according to claim 1, also comprising using different load instructions for different loaded block sizes.

7. The method according to claim 6, wherein said different load instructions differ in said size of said loaded block sizes by predefined factors compared to a basic load instruction.

8. The method according to claim 1, also comprising using different store instructions for different stored block sizes.

9. The method according to claim 8, wherein said different store instructions differ in said size of said stored block sizes by predefined factors compared to a basic store instruction.

10. The method according to claim 1, also comprising determining most recent past block size utilization values of said entries of past block size utilizations.

11. The method according to claim 1, also comprising determining an average block size based on said entries indicating the number of past block size utilizations for each block size in constant time intervals.

12. The method according to claim 3, wherein said applying said algorithm to said vectors of past block size utilizations comprises applying said algorithm based on one of time-series-based forecasting, linear regression and a neural network.

13. A system for dynamically selecting a size of a memory access at runtime, said system comprising:
   a memory configured to store instructions; and
   a processor coupled to the memory and configured to execute the instructions to:
      access a plurality of blocks, each block having a variable block size defined by a number of consecutive cache lines in each block;
      maintain a vector with entries indicating a number of past block size utilizations for each block size; and
      adapt a next block size of a next block before a next access to said next block based on the number of past block size utilizations for each block size.

14. The system according to claim 13, wherein the processor is also configured for adapting said next block size by:
   in response to determining, based on the vector, that a past block size being below a low threshold value has been utilized in a most recent access, decreasing said next block size to a first adapted block size, and
   in response to determining, based on the vector, that a past block size being greater than a high threshold value has been utilized in the most recent access, increasing said next block size to a second adapted block size.

15. The system according to claim 13, wherein the processor is also configured for adapting said next block size by applying an algorithm to said vector of past block size utilizations for predicting an adapted block size.

16. The system according to claim 13, wherein said processor is also adapted for using different load instructions for different loaded block sizes, and wherein said processor is also adapted for using different store instructions for different stored block sizes.

17. The system according to claim 16, wherein said different load instructions differ in said size of said loaded block sizes by predefined factors compared to a basic load instruction.

18. The system according to claim 13, wherein the processor is further configured to execute the instructions to determine most recent block size utilization values of said entries of past block size utilizations.

19. The system according to claim 13, wherein the processor is further configured to determine an average block size based on said entries indicating the number of past block size utilizations for each block size in constant time intervals.

20. A computer program product for dynamically selecting a size of a memory access at runtime, the computer program product comprising a computer readable storage medium having program instructions embodied therewith, the program instructions executable by a computer to cause the computer to:

access a plurality of blocks, each block having a variable block size defined by a number of consecutive cache lines in each block;

maintain a vector with entries indicating a number of past block size utilizations for each block size; and adapt a next block size of a next block before a next access to said next block based on the number of past block size utilizations for each block size.

* * * * *